(12) United States Patent
He et al.

(10) Patent No.: US 12,221,358 B2
(45) Date of Patent: Feb. 11, 2025

(54) CASCADE WATER RECYCLING INTELLIGENT SYSTEM FOR SHALE GAS EXPLOITATION

(71) Applicant: TIANJIN UNIVERSITY, Tianjin (CN)

(72) Inventors: Li He, Tianjin (CN); Wei Ye, Tianjin (CN)

(73) Assignee: TIANJIN UNIVERSITY (CN)

( * ) Notice: Subject to any disclaimer, the term of this patent is extended or adjusted under 35 U.S.C. 154(b) by 414 days.

(21) Appl. No.: 17/705,602

(22) Filed: Mar. 28, 2022

(65) Prior Publication Data
US 2022/0324725 A1 Oct. 13, 2022

(30) Foreign Application Priority Data
Mar. 31, 2021 (CN) .......................... 202110351952.8

(51) Int. Cl.
*G05B 19/00* (2006.01)
*C02F 1/00* (2023.01)
*G05B 19/042* (2006.01)
*C02F 103/00* (2006.01)
*C02F 103/10* (2006.01)

(52) U.S. Cl.
CPC ............ *C02F 1/008* (2013.01); *G05B 19/042* (2013.01); *C02F 2103/001* (2013.01); *C02F 2103/10* (2013.01); *C02F 2301/046* (2013.01); *G05B 2219/2605* (2013.01)

(58) Field of Classification Search
None
See application file for complete search history.

(56) References Cited

U.S. PATENT DOCUMENTS

| | | | |
|---|---|---|---|
| 2019/0145251 A1* | 5/2019 | Johnson | E21B 43/26 166/250.1 |
| 2019/0330980 A1* | 10/2019 | Zhu | E21B 49/003 |
| 2021/0388700 A1* | 12/2021 | Madasu | G06F 30/27 |

* cited by examiner

*Primary Examiner* — Paul B Yanchus, III

(57) ABSTRACT

Disclosed is a cascade water recycling intelligent system for shale gas exploitation, comprising a cascade water recycling system, wherein a data output end of the cascade water recycling system is connected with a data input end of an information system, a data output end of the information system is connected with a data input end of a decision making system, and a data output end of the decision making system is connected with a regulator; the cascade water recycling system comprises at least one time of water quantity judgment, a current exploiting intensity of shale gas is continued under a condition that the water quantity does not exceed a water safety threshold; and monitoring data is transferred to the information system under a condition that the water quantity exceeds the water safety threshold; the information system is further used for transferring the collected data to the decision making system.

11 Claims, 5 Drawing Sheets

CASCADE WATER RECYCLING INTELLIGENT SYSTEM FOR SHALE GAS EXPLOITATION

CROSS-REFERENCE TO RELATED APPLICATIONS

This application claims priority to Chinese Patent Application No. 202110351952.8, having a filing date of Mar. 31, 2021, the entire contents of which are hereby incorporated by reference.

FIELD

The application belongs to the technical field of shale gas exploitation and affiliation thereof, and specifically relates to an industrial effluent recycling technology, in particular to a cascade water recycling intelligent system for shale gas exploitation.

BACKGROUND

Shale gas is an unconventional natural gas occurred in melanic shale and argillaceous siltstone that are rich in organic matter and have extremely low porosity as well as permeability in a free state, an adsorbed state or a dissolved state, featuring self-generation and self-accumulation and continuous aggregation. The shale gas is turned into a novel energy source attracting a lot of attention with large source quantity and low carbon emission. In the present day when the country calls upon energy conservation and emission reduction and low carbon development, it shows a huge advantage and may become the most reliable energy replacing type in the future in China. With continuous development of shale gas exploitation, influence on regional water resource systems and its ecological systems in the exploitation process is the crucial problem in the industry.

Shale gas exploitation mainly adopts a hydrofracturing method, a horizontal well and the like, which are widely used techniques in the current shale gas exploitation process at present. However, there are problems of consumption of fresh water resource, regional water resource supply pressure, pollution of surface water and underground water and the like. It is mainly because that shale gas exploitation at present mainly uses fresh water resource such as water in surrounding areas and underground water. It takes several weeks for a hydrofracturing process, and in the process, it is needed to consume a lot of local water resource such as surface water or underground water, which is of highly possibility to affect local production, living and ecological water. In addition, in the shale gas exploitation process, there will be a lot of water generated, which leads to ecological environmental problems such as soil pollution, water pollution and heavy metal accumulation. Thus it can be seen that in the shale gas exploitation process, there are a water consumption contradiction that a lot of water resource needs to be used and a waste liquor treatment problem that a lot of waste liquor is generated. How to allocate and schedule the water resource reasonably and how to recycle the waste liquor generated in the exploitation process are problems needed to be solved urgently in the shale gas exploitation process.

With respect to the problems in the current shale gas exploitation process, it is of urgent need to form a reasonable, efficient and intelligent water resource recycling intelligent system in the shale gas exploitation process.

SUMMARY

In order to mainly solve the technical problems that in the shale gas exploitation, it is needed to consume a lot of water resource and generate a lot of waste liquor, and it is difficult to supply the water resource stably, reliably and sustainably and to treat the waste liquor, the present invention provides a cascade water recycling intelligent system for shale gas exploitation, where the water resource in exploitation is allocated and scheduled reasonably and the waste liquor in exploitation can be treated practically and reasonably.

A cascade water recycling intelligent system for shale gas exploitation includes a cascade water recycling system, wherein a data output end of the cascade water recycling system is connected with a data input end of an information system, a data output end of the information system is connected with a data input end of a decision making system, and a data output end of the decision making system is connected with a regulator;

the cascade water recycling system comprises at least one time of water quantity judgment, where a current shale gas exploiting intensity is continued under a circumstance that the water quantity does not exceed a water safety threshold; and monitoring data is transferred to the information system under a circumstance that the water quantity exceeds the water safety threshold;

the information system is further used for collecting a gas production rate and a water-deficient value in a current shale gas exploiting stage and transferring the collected data to the decision making system; the optimum gas production rate in a next stage, water demands of various water sources in the next stage and the water safety threshold in the next stage are obtained in the decision making system based on the data collected by the information system, and the decision making system is used for realizing prediction of the optimum gas production rate in the next stage; and the regulator is used for regulating and controlling the shale gas exploiting intensity in the current stage.

A shale gas exploiting effluent subjected to water treatment is mixed with rainwater treated by a rainwater treatment pool before the first time water quantity judgment, a mixed liquid serving as a class I water source for water cycling of shale gas exploitation; a recovered water quantity of such water can be predicted by a water quantity predictor; after the recovered water quantity is determined, whether the first time water quality reaches a standard or not is judged; and if the water quality does not reach the standard, the mixed liquid is subjected to water treatment again, the cycle is repeated till the water quality reaches the standard, and after the water quality reaches the standard, whether the first time water quantity is enough or not is judged.

If the first water quantity is enough, whether the first water quantity is utilized fully or not is judged; if the water quantity can be utilized fully, then such water is used for shale gas exploitation; if the water quantity has a surplus after being utilized, the excessive water is reinjected into underground water; and if the water quantity is too small and not enough, it is needed to introduce other water source.

If the water quantity is too small and not enough, it is needed to introduce a class II water source, the class II water source comprising purchased water, the class I water source that is not enough in water quantity is mixed with the class II water source, and whether the second time water quantity is enough or not is judged; if the water quantity is enough, whether the second time water quantity is utilized fully or not is judged; if the water quantity can be utilized fully, this water is used for shale gas exploitation; if the water quantity has a surplus after being utilized, the excessive water is reinjected into underground water; and if the water quantity is too small and not enough, it is needed to introduce other water source.

If the water quantity is too small and not enough, it is needed to introduce a class III water source, the class I water source and the class II water source that are not enough in water quantity are mixed with the class III water source, and whether the third time water quantity is enough or not is judged, the class III water source being originated from surface water and/or underground water; the water quantity can be predicted by the water quantity predictor; if the water quantity is enough, whether the third time water quantity is utilized fully or not is judged; if the water quantity can be utilized fully, such water is used for shale gas exploitation; if the water quantity has a surplus after being utilized, the excessive water is reinjected into underground water; and if the water quantity is too small and not enough, the water safety threshold is judged.

Whether the water quantity exceeds the water safety threshold or not is judged after the class I water source, the class II water source and the class III water source are mixed. If the water quantity does not exceed the safety threshold, the current shale gas exploiting intensity is continued; and if the water quantity exceeds the safety threshold, the gas production rate in the current stage, a proportion of the class I water source, a proportion of the class II water source and the water-deficient value in the current exploitation process of the shale gas are collected by the information system, and these data is input into the information system and the decision making system.

The decision making system is a literature mining intelligent decision making system based on knowledge graph for predicting the gas output in the next stage of shale gas exploitation and optimally configuring the water demands of all classes of water resource.

The present invention further includes a method for constructing a decision making model of a decision making system, including the following steps:

1) engineering data of water resource allocation for shale gas exploitation is originated from Chinese databases, patent databases and research reports and features wide source and poor structural property, and therefore, knowledge nodes and relation sides can be constructed via a knowledge graph construction technique after text data is pre-processed, so that a knowledge graph intelligent decision making model is constructed, the model aiming to dig out relations among different knowledge nodes from the text data;

2) from the prospective of water resource allocation, an engineering name (a certain shale gas exploitation area), an allocation time, an allocated water resource class (class I, II and III water) and the like can be selected as the knowledge nodes of the knowledge graph model; meanwhile, the water demand of a certain class of water, the shale gas exploiting intensity and the like can further be taken as the knowledge nodes; and finally, "the time is", "the water demand is" and "include" and the like can be taken as the relation sides among the nodes, and the constructed knowledge graph intelligent decision making model can realize a decision making function on the water demand and the like;

3) a schematic diagram of the knowledge graph model can be listed according to the defined knowledge nodes and relation sides, and a semantic network graph of the knowledge graph can be expanded to thousands of or even millions of knowledge triads according to the quantity of the triads; and 4) related knowledge reasoning engineering can be performed according to the semantic network graph of the knowledge graph, and one entity predicts and reasons a next entity as well as looks for the relation therebetween, thereby, the knowledge graph intelligent decision making model is constructed.

The knowledge reasoning includes the following steps:

defining a knowledge triad, a knowledge head node being h, the relation side being r and a knowledge end node being t, thereby determining the knowledge triad (h, r, t);

generating some path characteristics first by supervised random walk, a path consisting of a series of knowledge nodes and relation sides as follows:

$$P = T_0 \xrightarrow{r_1} T_1 \xrightarrow{r_2} \ldots \xrightarrow{r_{n-1}} T_{n-1} \xrightarrow{r_n} T_n, \quad (1)$$

where $T_n$ is a range of the relation side m and a domain of the relation side $r_{n-1}$, namely, $T_n$=range $(r_n)$=domain $(r_{n-1})$, thereby defining distribution of one relation side and knowledge node, based on a fact that a value obtained by distribution is a characteristic value $X_{h, p(t)}$ of each walk path, $X_{h, p(t)}$ can be construed as a probability from the knowledge head node n to the knowledge end node t along a certain path p, and an updating rule of the $X_{h, p(t)}$ is as follows:

$$Xh, p(e) = \sum_{e' \in range(p')} Xh, p'(e') \times P(e \mid e'; r_l), \quad (2)$$

where if e=S (the knowledge node in the path p), $X_{h, p(e)}=1$ and otherwise, $X_{h, p}$ $$(e) = 0. P(e \mid e'; r_l) = \frac{r_l(e', e)}{|r_l(e', \cdot)|}$$

represents a probability of starting from a knowledge node e' and reaching a knowledge node e along a relation side $r_1$. $r_1$ (e', e) represents whether there is a path with the relation type of $r_1$ between the knowledge node e' and the knowledge node e, if yes, a value thereof is 1, and otherwise, a value thereof is 0, and $|r_1(e', \cdot)|$ represents a quantity of the knowledge nodes reachable from the knowledge node e' through the relation side at a regulated path;

if it is desired to determine the relation side r between certain two knowledge nodes, it is necessary to obtain to a group of characteristic path $P_r=(P_1, \ldots, P_n)$ by the supervised random walk, the supervised random walk refers to guiding the walking knowledge nodes to walk based on random walk in a supervising mode, so that the random walk is purposeful;

the knowledge nodes and the relation sides related to the water demand are searched purposefully by the supervised random walk. A sequencing model for a prediction entity is then trained by utilizing these characteristic paths, and the sequencing model can be modeled by adopting a linear model method:

$$S_i = f(h, r_i, t) = \sum_{p \in p_r} X_{h,p}(t) \theta_p, \quad (3)$$

where f(h,$r_i$,t) represents a likelihood $S_i$ that there is a relation $r_i$ between the knowledge node h and the knowledge node t, $\theta_p$ represents a weight factor of the characteristic path corresponding to $P_r$, and a value of $\theta_p$ can be solved by training; where $y_i$={0, 1} can be used to represent a value of a certain training sample; if the value is 1, it is represented that there is the relation side r between the two knowledge nodes, and if the value is 0, it is represented that there is no relation side r; under a common circumstance, a sigmoid function can be used to map a predicted result to an interval of [0, 1], with a specific form as follows:

$$P(y_i = 1 \mid S_i) = \frac{\exp(S_i)}{1 + \exp(S_i)}, \quad (4)$$

with respect to the weight factor $\theta_p$, a loss function can be designed through the following linear changes in addition to maximum likelihood estimation:

$$L(\theta) = \prod_{i=1}^{n} P_i^{y_i}(1 - P_i)^{1-y_i}, \quad (5)$$

$$\ln L(\theta) = \sum_{i=1}^{n}(y_i \ln P_i + (1 - y_i)\ln(1 - P_i)), \quad (6)$$

finally, the intelligent decision making model based on the semantic network of the knowledge graph can be converted into an optimized target function with respect to the optimized weight factor $\theta p$.

The knowledge graph intelligent decision making model is evaluated after the knowledge graph intelligent decision making model is initially constructed; if an evaluation result indicates that the decision making model can be used for making decisions, it can be input by the information system to obtain an output value such as the water demand; and if the evaluation result indicates that the decision making model cannot be used for making decisions, the knowledge triad is updated and extracted, so that the intelligent decision making model is updated.

Input of the knowledge graph intelligent decision making model is prediction of the water demands of all classes of water resource, and the prediction is a ground of the supervised random walk. According to the prediction, search and decision making can be performed in the knowledge graph intelligent decision making model to look for the optimum water demand output result, and a non-restrictive example for prediction of the water demand at the output end is limited below.

It is assumed that with a certain period of time, the water demands of certain class of water resource from a time 1 to a time t are respectively $Q_1, Q_2 \ldots Q_t$, and the water demand $Q_{(t+1)}$ of the certain class of water resource at the time (t+1) can be predicted via the water demand prediction model by using the following prediction model.

A water demand change value at the time t:

$$\Delta Q_t = Q_t - Q_{t-1} \quad (7).$$

A second order difference water demand change value at the time t:

$$\Delta^2 Q_t = \Delta Q_t - \Delta Q_{t-1} \quad (8).$$

A second order difference water demand change predicted value at the time t:

$$\Delta^2 \hat{Q}_{t+1} = \alpha \Delta^2 Q_t + (1-\alpha)\Delta^2 \hat{Q}_t \quad (9).$$

Thus, a water demand predicted value at the time (t+1):

$$\hat{Q}_{t+1} = \Delta^2 \hat{Q}_{t+1} + \Delta Q_t + Q_t \quad (10).$$

A value of $\hat{Q}_{t+1}$ is input, and searching is performed via the constructed knowledge graph intelligent decision making policy to output the corresponding water demand values.

Compared with the prior art, the present invention has the technical effects:

1) aiming at problems that in the shale gas exploitation process, shale gas exploitation is usually performed by injecting a fracturing liquid and a flow back liquid generated by exploitation will discharge a lot of waste liquor, the present invention utilizes, plans and treats the waste liquor effectively and efficiently, not only allocates and schedules the water resource in the exploitation process reasonably, but also realizes recycling of the waste liquor in the whole exploitation process, and solves the technical defects that the water resource cannot be supplied stably and sustainably and it is difficult to treat the waste liquor and the treatment cost is high in the shale gas exploitation process well;

2) by introducing the decision making system, furthermore, the decision making system is the literature mining intelligent decision making system based on knowledge graph, which can construct the relations among the knowledge nodes in many aspects with respect to shale gas exploitation industry, and features large data scale, so that knowledge in the shale gas exploitation industry can be visualized and the consistency of knowledge can be enhanced, and thereby, management by staff is facilitated.

BRIEF DESCRIPTION OF DRAWINGS

Further description of the present invention will be made below in combination with drawings and embodiments.

DETAILED DESCRIPTION

Figure 1:
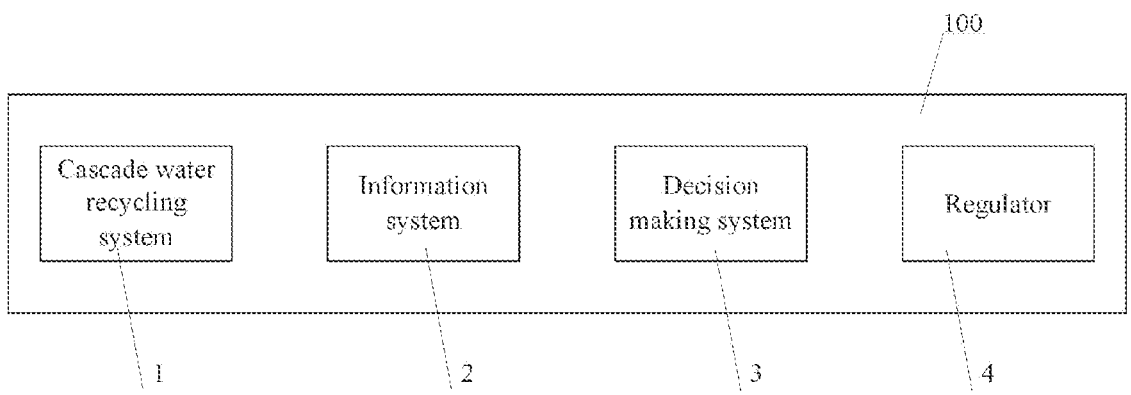
FIG. 1 is a schematic diagram of the present invention.

As shown in FIG. 1, a cascade water recycling intelligent system 100 for shale gas exploitation includes a cascade water recycling system 1, wherein a data output end of the cascade water recycling system 1 is connected with a data input end of an information system 2, a data output end of the information system 2 is connected with a data input end of a decision making system 3, and a data output end of the decision making system 3 is connected with a regulator 4;

the cascade water recycling system 1 includes at least one time of water quantity judgment, where a current shale gas exploiting intensity is continued under a circumstance that the water quantity does not exceed a water safety threshold; and monitoring data is transferred to the information system 2 under a circumstance that the water quantity exceeds the water safety threshold;

the information system 2 is further used for collecting a gas production rate and a water-deficient value in a current shale gas exploiting stage and transferring the collected data to the decision making system 3; the optimum gas production rate in a next stage, water demands of various water sources in the next stage and the water safety threshold in the next stage are obtained in the decision making system 3 based on the data collected by the information system 2, and the decision making system 3 is used for realizing prediction of the optimum gas production rate in the next stage; and the regulator 4 is used for regulating and controlling the shale gas exploiting intensity in the current stage.

The cascade water recycling system includes judging the first time water quality, judging whether the third time water quantity is enough or not, judging whether the third time water quantity is used for shale gas exploitation by 100% or not and judging the first time water quantity exceeds the water safety threshold or not.

Figure 2:
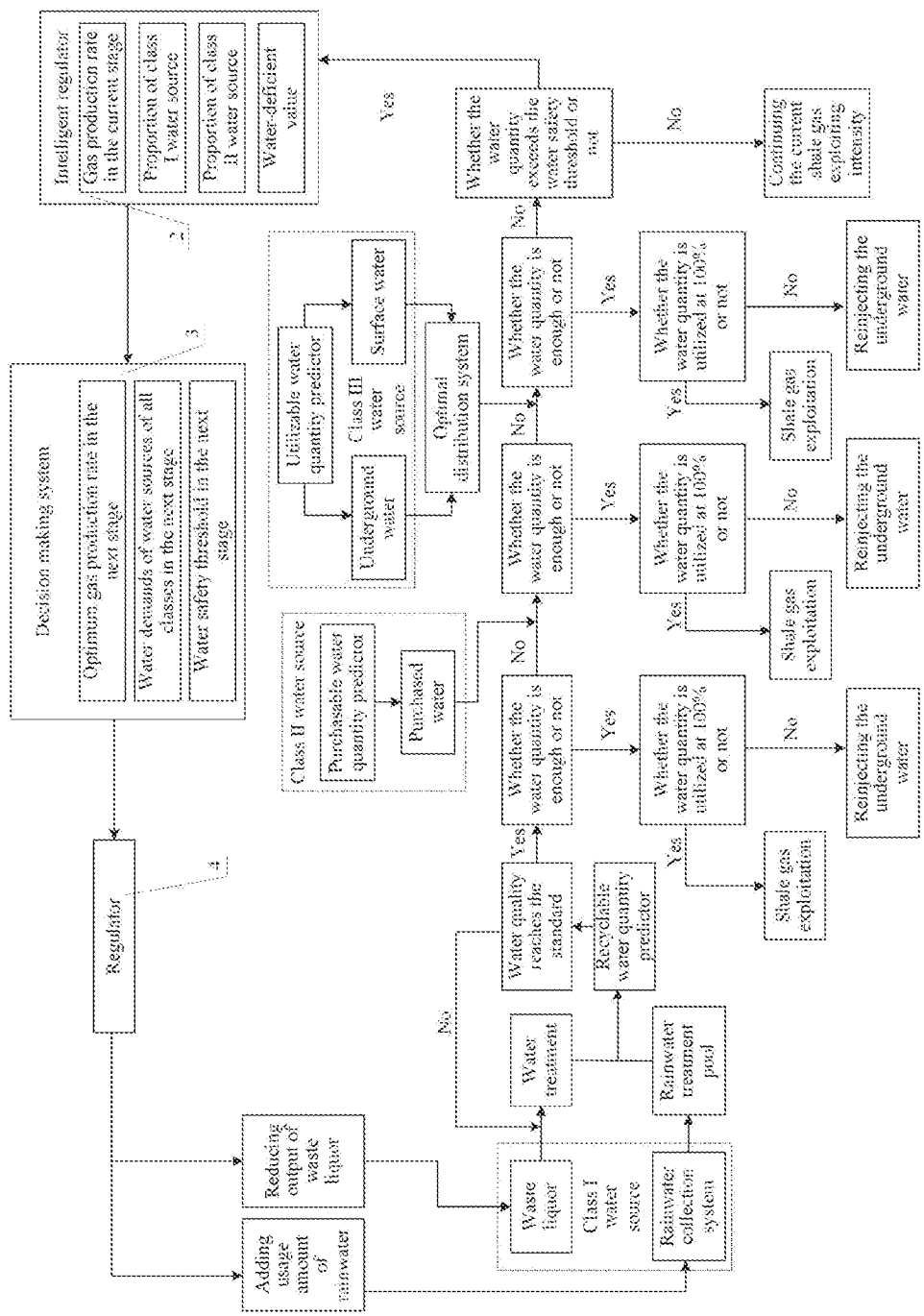
FIG. 2 is a system block diagram of the present invention.

As shown in FIG. 2, specifically, the waste liquor of the flow back liquid in certain time shale gas exploitation can be purified via conventional physical, chemical and biological process methods for waste liquor. At the same time, in the shale gas exploitation areas, natural rainfall can be collected by the rainwater collection system, and the collected rainwater can be subjected to water quality treatment via the rainwater treatment pool. A shale gas exploiting effluent subjected to water treatment is mixed with rainwater treated by a rainwater treatment pool, a mixed liquid serving as a class I water source for water cycling of shale gas exploitation; a recovered water quantity of such water can be predicted by a water quantity predictor; after the recovered water quantity is determined, whether the first time water quality reaches a standard or not is judged; and if the water quality does not reach the standard, the mixed liquid is subjected to water treatment again, and if the water quality reaches the standard, whether the first time water quantity is enough or not is judged.

The water quantity predictor and the intelligent regulator perform water quantity prediction and regulation and control based on a production standard in the shale gas exploitation industry. The water quantity predictor and the intelligent regulator can be programmable logic controllers (PLC) which are digit arithmetic operation electronic systems designed especially for being applied in an industry environment with functions of controlling sequences, timing, counting and the like and capable of controlling various mechanical and production processes, the models of the PLC being optionally Siemens PLC S7-200.

It is needed to judge whether the first time water quantity is enough or not for the class I water resource with the water quantity reaching the standard. If the water quantity is enough, whether the first time water quantity is utilized by 100% or not is judged; if the water quantity is utilized by 100%, then such water is used for shale gas exploitation and if the water quantity is not utilized by 100%, the excessive water is reinjected to the underground water; and if the water quantity is not enough, it is needed to introduce the class II water source.

It is needed to mix the class I water source which is not enough in water quantity with the class II water source and then judge whether the second time water quantity is enough or not. The class II water source is originated from purchased water, the water quantity of which can be predicted via the purchased water quantity predictor. If the water quantity is enough, whether the second time water quantity is utilized by 100% or not is judged; if the water quantity is utilized by 100%, then such water is used for shale gas exploitation and if the water quantity is not utilized by 100%, the excessive water is reinjected to the underground water; and if the water quantity is not enough, it is needed to introduce the class III water source.

It is needed to mix the class I water source and the class II water source which are not enough in water quantity with the class III water source and then judge whether the third time water quantity is enough or not. The class III water source is originated from surface water and underground water, the water quantity of which can be predicted via the purchased water quantity predictor by means of water quantity. If the water quantity is enough, whether the third time water quantity is utilized by 100% or not is judged; if the water quantity is utilized by 100%, then such water is used for shale gas exploitation and if the water quantity is not utilized by 100%, the excessive water is reinjected to the underground water; and if the water quantity is not enough, it is needed to judge the water safety threshold.

Figure 3:
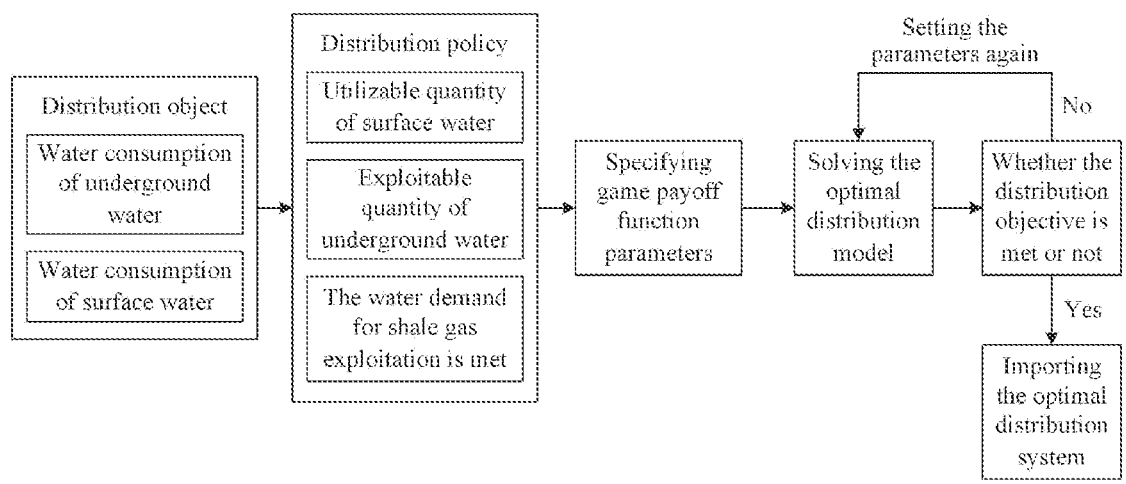
FIG. 3 is a principle diagram of a distribution model of an optimal distribution system.

Respective taking quantities of the surface water and the underground water in the class III water source are optimally distributed via an optimal distribution system; as shown in FIG. 3, distribution objects of the optimal distribution system are an underground water consumption and a surface water consumption, a policy adopted for distribution is that the utilizable quantity of the surface water and the utilizable quantity of the underground water meet a water demand for shale gas exploitation, parameters of a game payoff function are specified according to the distribution policy, and finally, an optimal distribution model is solved. If the solved model meets a distribution objective, the model is imported into the optimal distribution system for optimal distribution of the class III water source; and if the solved optimal distribution model does not meet the distribution objective, the parameters are reset and the model is solved again.

As shown in FIG. 2, whether the water quantity exceeds the water safety threshold or not is judged after the class I water source, the class II water source and the class III water source are mixed. If the water quantity does not exceed the safety threshold, the current shale gas exploiting intensity is continued; and if the water quantity exceeds the safety threshold, the gas production rate in the current stage, a proportion of the class I water source, a proportion of the class II water source and the water-deficient value in the current exploitation process of the shale gas are collected by the information system these data is input into the information system and the decision making system, where the information system can store data efficiently and safely, and needs to fit mass data scenes such as Internet of things and big data, and a Tencent cloud time sequence database-TencentDB for CTSDB can be selected herein.

Preferably, the decision making system is the literature mining intelligent decision making system based on knowledge graph.

The literature mining intelligent decision making system based on knowledge graph constructs a large-scale semantic network which becomes a carrier of big data, then knowledge reasoning is performed by a knowledge reasoning algorithm to look for the relation between the knowledge nodes, which is the characteristic not belonging to other intelligent algorithms. The knowledge graph makes intelligence of the decision making system be superior to that of conventional intelligent systems.

The literature mining intelligent decision making system based on knowledge graph can update the knowledge triad extraction mode according to feedback in the production process of the shale gas exploitation process so as to update the knowledge graph intelligent decision making model, and features real-time and variability, and thereby, its application range is widened.

As shown in FIG. 1, based on the data collected by the information system, the optimum gas output in the next stage, the water demands of all classes of water sources in the next stage and the water safety thread in the next stage can be obtained based on the literature mining intelligent decision making system based on knowledge graph.

Figure 4:
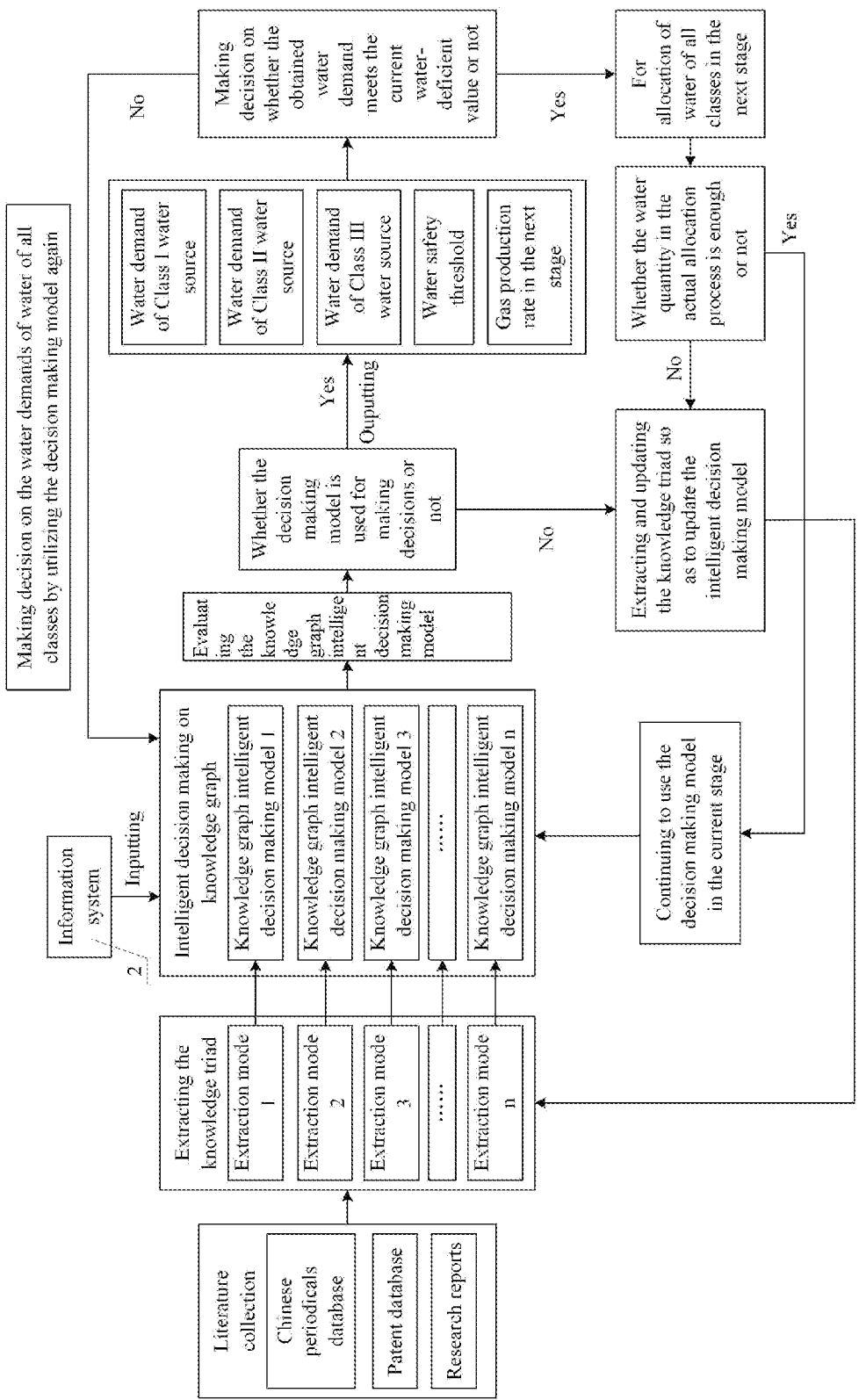
FIG. 4 is a structural schematic diagram of a decision making system.

A specific process of the literature mining intelligent decision making system based on knowledge graph is as shown in FIG. 4.

The schematic diagram of FIG. 4 illustrates a non-restrictive example of the literature mining intelligent decision making system based on knowledge graph according to the present invention.

Information of the gas output in the current stage, the proportions of all classes of water source and the water-deficient value input by the information system is input into the knowledge graph decision making model constructed in the decision making system, and is researched via the semantic network in the decision making model to output the water demand of the class I water source, the water demand of the class II water source, the water demand of the class III water source, the water safety threshold and the gas output in the next stage. First time judgment is performed after an output result is obtained. If the water demand obtained by decision making meets the current water-deficient value, then it is used for allocation of all classes of water in the next stage, and if the water demand obtained by decision making does not meet the current water-deficient value, then a decision on the water demands of all classes of water is made by utilizing the decision making model again. Then second time judgment is performed. If in the actual allocation process, the water quantity is enough, the decision making model in the previous stage is followed, and if the water quantity is not enough, then knowledge triad extraction is updated, so that the decision making model is updated.

Literatures constructed by the knowledge graph are originated from Chinese periodical databases, patent databases and research reports.

The knowledge triad extraction modes include any n extraction modes. A plurality of non-restrictive examples can be listed with respect to structural and unstructured data in the literatures.

The extraction mode 1 can be used for extracting the knowledge triads related to the water demand of the class I water source, the extraction mode 2 can be used for extracting the knowledge triads related to the water demand of the class II water source, and the extraction mode n can be used for extracting the knowledge triads with respect to the relation between the water demand and the water safety threshold by parity of reasoning.

The knowledge graph intelligent decision making model includes any n prediction models which are obtained by constructing the knowledge graph by different knowledge extraction results, and thereby, a plurality of non-restrictive examples can be listed.

The extraction result 1 is used for constructing the knowledge graph intelligent decision making model 1, the extraction result 2 is used for constructing the knowledge graph intelligent decision making model 2, and the extraction result n is used for constructing the knowledge graph intelligent decision making model n by parity of reasoning.

Figure 5:
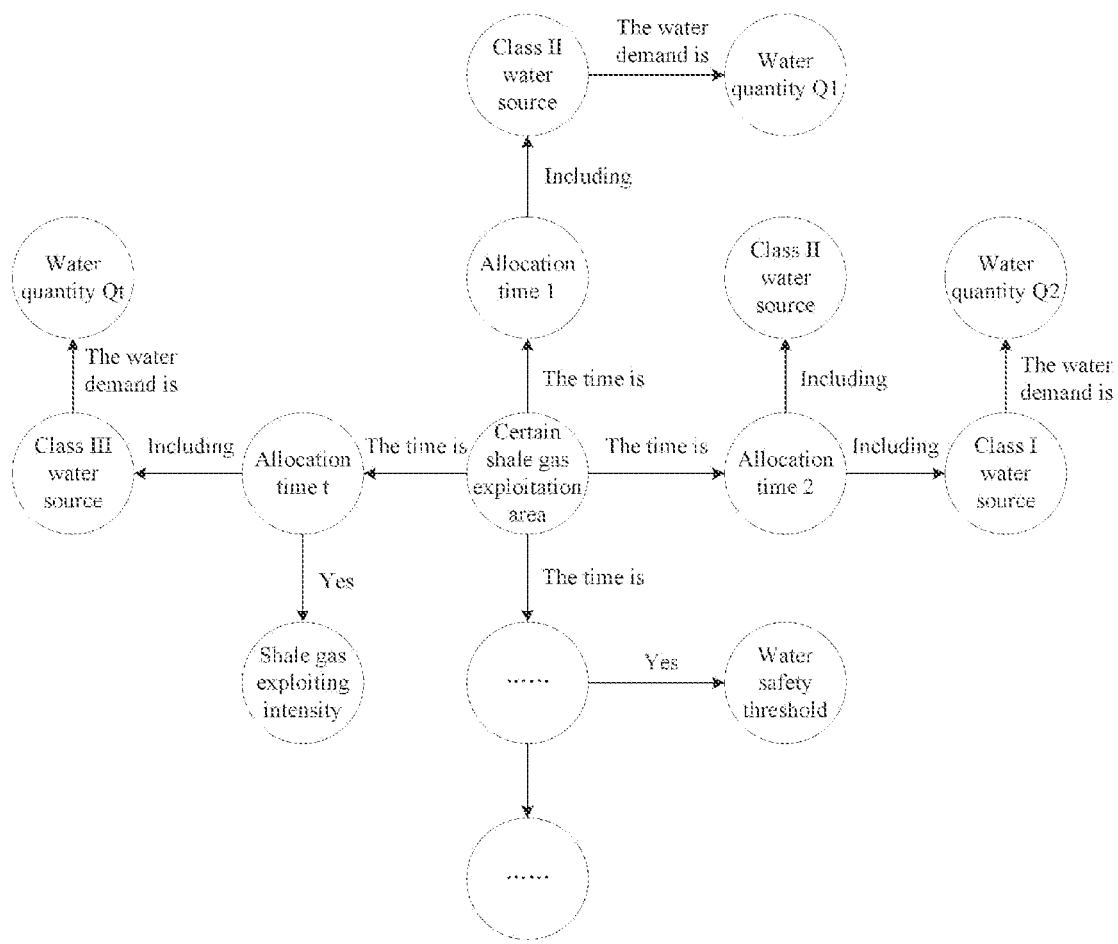
FIG. 5 is a local schematic diagram of a semantic network of a knowledge graph.

Constructing the knowledge graph intelligent decision making model includes the following steps:

1) engineering data of water resource allocation for shale gas exploitation is originated from a Chinese databases, patent databases and research reports and features wide source and poor structural property, and therefore, knowledge nodes and relation sides can be constructed via a knowledge graph construction technique after text data is pre-processed, so that a knowledge graph intelligent decision making model is constructed, the model aiming to dig out relations among different knowledge nodes from the text data;

2) from the prospective of water resource allocation, an engineering name (a certain shale gas exploitation area), an allocation time, an allocated water resource class (class I, II and III water) and the like can be selected as the knowledge nodes of the knowledge graph model; meanwhile, the water demand of a certain class of water, the shale gas exploiting intensity and the like can further be taken as the knowledge nodes; and finally, "the time is", "the water demand is" and "include" and the like can be taken as the relation sides among the nodes; and the constructed knowledge graph intelligent decision making model can realize a decision making function on the water demand and the like;

3) a schematic diagram of the knowledge graph model can be listed according to the defined knowledge nodes and relation sides, and a local schematic diagram is as shown in FIG. 5; a semantic network graph of the knowledge graph can be expanded to thousands of or even millions of knowledge triads according to the quantity of the triads; and 4) related knowledge reasoning engineering can be performed according to the semantic network graph of the knowledge graph, and one entity predicts and reasons a next entity as well as looks for the relation therebetween, thereby, the knowledge graph intelligent decision making model is constructed.

When knowledge reasoning is performed, a reasoning algorithm: Path Ranking Algorithm based on the knowledge graph structure can be adopted, thereby performing link prediction reasoning by taking a relation side between the knowledge nodes.

A knowledge triad is defined, a knowledge head node being h, the relation side being r and a knowledge end node being t, thereby determining the knowledge triad (h, r, t).

In the PRA algorithm, some path characteristics are generated first by supervised random walk, a path consisting of a series of knowledge nodes and relation sides as follows:

$$P = T_0 \xrightarrow{r_1} T_1 \xrightarrow{r_2} \ldots \xrightarrow{r_{n-1}} T_{n-1} \xrightarrow{r_n} T_n, \tag{1}$$

where $T_n$ is a range of the relation side m and a domain of the relation side $r_{n-1}$, namely, $T_n$=range $(r_n)$=domain $(r_{n-1})$. The algorithm defines distribution of one relation side and knowledge node, based on a fact that a value obtained by distribution is a characteristic value $X_{h, p(t)}$ of each walk path, $X_{h, p(t)}$ can be construed as a probability from the knowledge head node n to the knowledge end node t along a certain path p. An updating rule of the $X_{h, p(t)}$ is as follows:

$$X_h, p(e) = \sum_{e' \in range(p')} X_h, p'(e') \times P(e \mid e'; r_l), \tag{2}$$

where if e=S (the knowledge node in the path p), $X_{h, p}$ $(e)$=1 and otherwise, $X_{h, p}$ $$(e) = 0. \ P(e \mid e'; r_l) = \frac{r_l(e', e)}{|r_l(e', \cdot)|}$$

represents a probability of starting from a knowledge node e' and reaching a knowledge node e along a relation side $r_1$. $r_1$ (e', e) represents whether there is a path with the relation type of $r_1$ between the knowledge node e' and the knowledge node e, if yes, a value thereof is 1, and otherwise, a value thereof is 0, and $|r_1(e', \cdot)|$ represents a quantity of the knowledge nodes reachable from the knowledge node e' through the relation side at a regulated path.

If it is desired to determine the relation side r between certain two knowledge nodes, it is necessary to obtain to a group of characteristic path $P_r=(P_1, \ldots P_n)$ by the supervised random walk, the supervised random walk refers to guiding the walking knowledge nodes to walk based on random walk in a supervising mode, so that the random walk is purposeful. In the example, the knowledge nodes and the relation sides related to the water demand are searched purposefully by the supervised random walk. A sequencing model for a prediction entity is then trained by utilizing these characteristic paths, and the sequencing model can be modeled by adopting a linear model method:

$$S_i = f(h, r_i, t) = \sum_{p \in p_r} X_{h,p}(t)\theta_p, \qquad (3)$$

where $f(h,r_i,t)$ represents a likelihood $S_i$ that there is a relation $r_i$ between the knowledge node h and the knowledge node t, $\theta_p$ represents a weight factor of the characteristic path corresponding to $P_r$, and a value of $\theta_p$ can be solved by training. $y_i=\{0, 1\}$ can be used to represent a value of a certain training sample; if the value is 1, it is represented that there is the relation side r between the two knowledge nodes, and if the value is 0, it is represented that there is no relation side r. Under a common circumstance, a sigmoid function can be used to map a predicted result to an interval of [0, 1], with a specific form as follows:

$$P(y_i = 1 \mid S_i) = \frac{\exp(S_i)}{1 + \exp(S_i)}, \qquad (4)$$

with respect to the weight factor $\theta_p$, a loss function can be designed through the following linear changes in addition to maximum likelihood estimation:

$$L(\theta) = \prod_{i=1}^{n} P_i^{y_i}(1-P_i)^{1-y_i}, \qquad (5)$$

$$\ln L(\theta) = \sum_{i=1}^{n} (y_i \ln P_i + (1-y_i)\ln(1-P_i)). \qquad (6)$$

Finally, the intelligent decision making model based on the semantic network of the knowledge graph can be converted into an optimized target function with respect to the optimized weight factor $\theta_p$.

The knowledge graph intelligent decision making model is evaluated after the knowledge graph intelligent decision making model is initially constructed; if an evaluation result indicates that the decision making model can be used for making decisions, it can be input by the information system to obtain an output value such as the water demand; and if the evaluation result indicates that the decision making model cannot be used for making decisions, the knowledge triad is updated and extracted, so that the intelligent decision making model is updated.

Input of the knowledge graph intelligent decision making model is prediction of the water demands of all classes of water resource, and the prediction is a ground of the supervised random walk. According to the prediction, search and decision making can be performed in the knowledge graph intelligent decision making model to look for the optimum water demand output result, and a non-restrictive example for prediction of the water demand at the output end is limited below.

It is assumed that with a certain period of time, the water demands of certain class of water resource from a time 1 to a time t are respectively $Q_1, Q_2 \ldots Q_t$, and the water demand $Q_{(t+1)}$ of the certain class of water resource at the time (t+1) can be predicted via the water demand prediction model by using the following prediction model.

A water demand change value at the time t:

$$\Delta Q_t = Q_t - Q_{t-1} \qquad (7).$$

A second order difference water demand change value at the time t:

$$\Delta^2 Q_t = \Delta Q_t - \Delta Q_{t-1} \qquad (8).$$

A second order difference water demand change predicted value at the time t:

$$\Delta^2 \hat{Q}_{t+1} = \alpha \Delta^2 Q_t + (1-\alpha)\Delta^2 \hat{Q}_t \qquad (9).$$

Thus, a water demand predicted value at the time (t+1):

$$\hat{Q}_{t+1} = \Delta^2 \hat{Q}_{t+1} + \Delta Q_t + Q_t \qquad (10).$$

A value of $\hat{Q}_{t+1}$ is input, and searching is performed via the constructed knowledge graph intelligent decision making policy to output the corresponding water demand values.

As shown in FIG. 2, regulation and control by the regulator is based on output of the gas output in the next stage, the water demand in the next stage and the water safety threshold in the next stage by the decision making system. The current shale gas exploiting intensity and the water demand can be regulated via the regulator according to a specific output result of the decision making system by way of reducing the output of the waste liquor and increasing the water consumption of rainwater.

What is claimed is:

1. A cascade water recycling intelligent system for shale gas exploitation, comprising a cascade water recycling system (1), wherein a data output end of the cascade water recycling system (1) is connected with a data input end of an information system (2), a data output end of the information system (2) is connected with a data input end of a decision making system (3), and a data output end of the decision making system (3) is connected with a regulator (4);

the cascade water recycling system (1) comprises at least one time of water quantity judgment, wherein a current exploiting intensity of shale gas is continued under a condition that the water quantity does not exceed a water safety threshold; and monitoring data is transferred to the information system (2) under a condition that the water quantity exceeds the water safety threshold;

the information system (2) is further used for collecting a gas production rate and a water-deficient value in a current shale gas exploiting stage and transferring the collected data to the decision making system (3); an optimum gas production rate in a next stage, water demands of various water sources in the next stage and the water safety threshold in the next stage are obtained in the decision making system (3) based on the collected data collected by the information system (2), and the decision making system (3) is used for realizing prediction of the optimum gas production rate in the next stage; and the regulator (4) is used for regulating and controlling the exploiting intensity of shale gas in the current stage.

2. The cascade water recycling intelligent system for shale gas exploitation according to claim 1, wherein a shale gas exploiting effluent subjected to water treatment is mixed with rainwater treated by a rainwater treatment pool before a first time water quantity judgment, a mixed liquid serving as a class I water source for water cycling of shale gas exploitation; a recovered water quantity of such water can be predicted by a water quantity predictor; after the recovered water quantity is determined, whether the first time water quality reaches a standard or not is judged; and if the water quality does not reach the standard, the mixed liquid is subjected to water treatment again, above cycle is repeated till the water quality reaches the standard, and after the water quality reaches the standard, whether the first time water quantity is enough or not is judged.

3. The cascade water recycling intelligent system for shale gas exploitation according to claim 2, wherein if the first water quantity is enough, whether the first water quantity is utilized fully or not is judged; if the water quantity can be utilized fully, then such water is used for shale gas exploitation; if the water quantity has a surplus after being utilized, an excessive water is reinjected into underground water; and if the water quantity is too small and not enough, it is needed to introduce other water source.

4. The cascade water recycling intelligent system for shale gas exploitation according to claim 3, wherein if the water quantity is too small and not enough, it is needed to introduce a class II water source, the class II water source comprising purchased water, the class I water source that is not enough in water quantity is mixed with the class II water source, and whether a second time water quantity is enough or not is judged; if the water quantity is enough, whether the second time water quantity is utilized fully or not is judged; if the water quantity can be utilized fully, this water is used for shale gas exploitation; if the water quantity has a surplus after being utilized, the excessive water is reinjected into underground water; and if the water quantity is too small and not enough, it is needed to introduce other water source.

5. The cascade water recycling intelligent system for shale gas exploitation according to claim 4, wherein if the water quantity is too small and not enough, it is needed to introduce a class III water source, the class I water source and the class II water source that are not enough in water quantity are mixed with the class III water source, and whether a third time water quantity is enough or not is judged, the class III water source being originated from surface water and/or underground water; the water quantity can be predicted by the water quantity predictor; if the water quantity is enough, whether the third time water quantity is utilized fully or not is judged; if the water quantity can be utilized fully, such water is used for shale gas exploitation; if the water quantity has a surplus after being utilized, the excessive water is reinjected into underground water; and if the water quantity is too small and not enough, the water safety threshold is judged.

6. The cascade water recycling intelligent system for shale gas exploitation according to claim 5, wherein after the class I water source, the class II water source and the class III water resource are mixed, whether the water quantity exceeds the safety threshold or not is judged; if the water quantity does not exceed the safety threshold, a current shale gas exploiting intensity is continued; and if the water quantity exceeds the safety threshold, the gas production rate in a current stage, a proportion of the class I water source, a proportion of the class II water source and the water-deficient value in a current exploitation process of the shale gas are collected by the information system, and these data is input into the information system (2) and the decision making system (3).

7. The cascade water recycling intelligent system for shale gas exploitation according to claim 5, wherein respective taking quantities of the surface water and the underground water in the class III water source are optimally distributed via an optimal distribution system, distribution objects of the optimal distribution system are an underground water consumption and a surface water consumption, a policy adopted for distribution is that the utilizable quantity of the surface water and the utilizable quantity of the underground water meet a water demand for shale gas exploitation, parameters of a game payoff function are specified according to the distribution policy, and finally, an optimal distribution model is solved; if the solved model meets a distribution objective, the model is imported into the optimal distribution system for optimal distribution of the class III water source; and if the solved optimal distribution model does not meet the distribution objective, the parameters are reset and the model is solved again.

8. The cascade water recycling intelligent system for shale gas exploitation according to claim 1, wherein a method for constructing a decision making model of a decision making system comprises the following steps:

1) engineering data of water resource allocation for shale gas exploitation is originated from Chinese databases, patent databases and research reports and features wide source and poor structural property, and therefore, knowledge nodes and relation sides can be constructed via a knowledge graph construction technique after text data is pre-processed, so that a knowledge graph intelligent decision making model is constructed, the model aiming to dig out relations among different knowledge nodes from the text data;

2) from the prospective of water resource allocation, an engineering name (a certain shale gas exploitation area), an allocation time, an allocated water resource class (class I, II and III water) and the like can be selected as the knowledge nodes of the knowledge graph model; meanwhile, the water demand of a certain class of water, the shale gas exploiting intensity and the like can further be taken as the knowledge nodes; and finally, "the time is", "the water demand is" and "include" and the like can be taken as the relation sides among the nodes, and the constructed knowledge graph intelligent decision making model can realize a decision making function on the water demand and the like;

3) a schematic diagram of the knowledge graph model can be listed according to the defined knowledge nodes and relation sides, and a semantic network graph of the knowledge graph can be expanded to thousands of or even millions of knowledge triads according to the quantity of the triads; and 4) related knowledge reasoning engineering can be performed according to the semantic network graph of the knowledge graph, and one entity predicts and reasons a next entity as well as looks for the relation therebetween, thereby, the knowledge graph intelligent decision making model is constructed.

9. The cascade water recycling intelligent system for shale gas exploitation according to claim 8, wherein the knowledge reasoning comprises the following steps:

defining a knowledge triad, a knowledge head node being h, the relation side being r and a knowledge end node being t, thereby determining the knowledge triad (h, r, t);

generating some path characteristics first by supervised random walk, a path consisting of a series of knowledge nodes and relation sides as follows:

$$P = T_0 \xrightarrow{r_1} T_1 \xrightarrow{r_2} \ldots \xrightarrow{r_{n-1}} T_{n-1} \xrightarrow{r_n} T_n, \tag{1}$$

wherein $T_n$ is a range of the relation side m and a domain of the relation side $r_{n-1}$, namely, $T_n$=range $(r_n)$=domain $(r_{n-1})$, thereby defining distribution of one relation side and knowledge nodes, based on a fact that a value obtained by distribution is a characteristic value $X_{h, p(t)}$ of each walk path, $X_{h, p(t)}$ can be construed as a probability from the knowledge head node n to the knowledge end node t along a certain path p, and an updating rule of the $X_{h, p(t)}$ is as follows:

$$X_h, p(e) = \sum_{e' \in range(p')} X_h, p'(e') \times P(e \mid e'; r_l), \tag{2}$$

wherein if e=S (the knowledge node in the path p), $X_{h, p(e)}=1$, and otherwise, $$X_{h,p(e)} = 0; P(e \mid e'; r_l) = \frac{r_l(e', e)}{|r_l(e', \cdot)|}$$

represents a probability of starting from a knowledge node e' and reaching a knowledge node e along a relation side $r_1$; $r_1$(e', e) represents whether there is a path with the relation type of $r_1$ between the knowledge node e' and the knowledge node e, if yes, a value thereof is 1, and otherwise, a value thereof is 0, and $|r_1(e', \cdot)|$ represents a quantity of the knowledge nodes reachable from the knowledge node e' through the relation side at a regulated path;

if it is desired to determine the relation side r between certain two knowledge nodes, it is necessary to obtain to a group of characteristic path $P_r=(P_1, \ldots, P_n)$ by the supervised random walk, the supervised random walk refers to guiding the walking knowledge nodes to walk based on random walk in a supervising mode, so that the random walk is purposeful;

the knowledge nodes and the relation sides related to the water demand are searched purposefully by the supervised random walk, a sequencing model for a prediction entity is then trained by utilizing these characteristic paths, and the sequencing model can be modeled by adopting a linear model method:

$$S_i = f(h, r_i, t) = \sum_{p \in p_r} X_{h,p}(t) \theta_p, \tag{3}$$

wherein $f(h, r_i, t)$ represents a likelihood $S_i$ that there is a relation $r_i$ between the knowledge node h and the knowledge node t, $\theta_p$ represents a weight factor of the characteristic path corresponding to $P_r$, and a value of $\theta_p$ can be solved by training;

wherein $y_i=\{0, 1\}$ can be used to represent a value of a certain training sample; if the value is 1, it is represented that there is the relation side r between the two knowledge nodes, and if the value is 0, it is represented that there is no relation side r; under a common circumstance, a sigmoid function can be used to map a predicted result to an interval of [0, 1], with a specific form as follows:

$$P(y_i = 1 \mid S_i) = \frac{\exp(S_i)}{1 + \exp(S_i)}, \tag{4}$$

with respect to the weight factor $\theta_p$, a loss function can be designed through the following linear changes and maximum likelihood estimation:

$$L(\theta) = \prod_{i=1}^{n} P_i^{y_i}(1 - P_i)^{1-y_i}, \tag{5}$$

$$\ln L(\theta) = \sum_{i=1}^{n}(y_i \ln P_i + (1 - y_i)\ln(1 - P_i)), \tag{6}$$

finally, the intelligent decision making model based on the semantic network of the knowledge graph can be converted into an optimized target function with respect to the optimized weight factor $\theta_p$.

10. The cascade water recycling intelligent system for shale gas exploitation according to claim 8, wherein the knowledge graph intelligent decision making model is evaluated after the knowledge graph intelligent decision making model is initially constructed; if an evaluation result indicates that the decision making model can be used for making decisions, it can be input by the information system to obtain an output value such as the water demand; and if the evaluation result indicates that the decision making model cannot be used for making decisions, the knowledge triad is updated and extracted, so that the intelligent decision making model is updated.

11. The cascade water recycling intelligent system for shale gas exploitation according to claim 9, wherein the knowledge graph intelligent decision making model is evaluated after the knowledge graph intelligent decision making model is initially constructed; if an evaluation result indicates that the decision making model can be used for making decisions, it can be input by the information system to obtain an output value such as the water demand; and if the evaluation result indicates that the decision making model cannot be used for making decisions, the knowledge triad is updated and extracted, so that the intelligent decision making model is updated.

* * * * *